United States Patent
Masuta et al.

(10) Patent No.: US 10,272,488 B2
(45) Date of Patent: Apr. 30, 2019

(54) LOW-PRESSURE CASTING DEVICE AND LOW-PRESSURE CASTING METHOD

(71) Applicant: Nissan Motor Co., Ltd., Yokohama-shi, Kanagawa (JP)

(72) Inventors: Tatsuya Masuta, Kanagawa (JP); Kenji Hayashi, Kanagawa (JP); Shinichi Tsuchiya, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 15/538,968

(22) PCT Filed: Dec. 24, 2014

(86) PCT No.: PCT/JP2014/084160
§ 371 (c)(1),
(2) Date: Jun. 22, 2017

(87) PCT Pub. No.: WO2016/103369
PCT Pub. Date: Jun. 30, 2016

(65) Prior Publication Data
US 2017/0348767 A1    Dec. 7, 2017

(51) Int. Cl.
*B22D 18/04* (2006.01)
*B22D 18/08* (2006.01)
*B22C 9/06* (2006.01)
*B22D 29/00* (2006.01)
*G01F 23/00* (2006.01)

(52) U.S. Cl.
CPC .............. *B22D 18/04* (2013.01); *B22C 9/067* (2013.01); *B22D 18/08* (2013.01); *B22D 29/00* (2013.01); *G01F 23/00* (2013.01)

(58) Field of Classification Search
CPC ............ B22D 18/04; B22D 18/08; B22C 9/06
USPC ... 164/457, 254, 255, 256, 257, 258, 61, 63, 164/65
See application file for complete search history.

(56) References Cited

U.S. PATENT DOCUMENTS

| 4,143,687 A | 3/1979 | Belloci |
| 4,585,050 A * | 4/1986 | Merrien et al. ........ B22D 18/08 |
| | | 164/119 |

(Continued)

FOREIGN PATENT DOCUMENTS

| DE | 39 41 538 A1 * | 6/1991 | ............. B22D 18/04 |
| EP | 0 599 768 A1 * | 6/1994 | ............. B22D 18/04 |

(Continued)

*Primary Examiner* — Kevin P Kerns
(74) *Attorney, Agent, or Firm* — Global IP Counselors, LLP

(57) ABSTRACT

A low-pressure casting device is provided with a holding furnace, a stoke, a pressure control device and a molten-metal level sensor. The holding furnace holds molten metal. The stoke supplies molten metal into a casting mold via a sprue. The pressure control device moves the molten metal in the stoke and fills the molten metal in the casting mold. The molten-metal level sensor detects a surface level of the molten-metal in the stoke. The stoke has a lower end immersed in the molten metal in the holding furnace. The low-pressure casting device is configured to correct filling of the molten metal in the casting mold in a next casting based on the height of the molten metal surface detected by the molten-metal level sensor.

8 Claims, 6 Drawing Sheets

(56) References Cited

U.S. PATENT DOCUMENTS

| | | | |
|---|---|---|---|
| 6,247,521 B1 * | 6/2001 | Kawai et al. | B22D 18/04 164/119 |
| 2016/0045955 A1 | 2/2016 | Sasaki et al. | |

FOREIGN PATENT DOCUMENTS

| | | | | |
|---|---|---|---|---|
| JP | 61-95760 A | | 5/1986 | |
| JP | 62-192248 A | | 8/1987 | |
| JP | 62-192249 A | | 8/1987 | |
| JP | 63-220969 A | | 9/1988 | |
| JP | 52-35122 A | | 3/1997 | |
| JP | 11-47910 A | * | 2/1999 | B22D 18/04 |
| JP | 11-138250 A | | 5/1999 | |
| JP | H11-221659 A | | 8/1999 | |
| JP | 11-300464 A | | 11/1999 | |
| JP | 2012-176424 A | | 9/2012 | |
| JP | 2014-180696 A | | 9/2014 | |
| WO | 2014/147892 A1 | | 9/2014 | |

* cited by examiner

LOW-PRESSURE CASTING DEVICE AND LOW-PRESSURE CASTING METHOD

CROSS-REFERENCE TO RELATED APPLICATIONS

This application is a U.S. National stage application of International Application No. PCT/JP2014/084160, filed Dec. 24, 2014.

BACKGROUND

Field of the Invention

The present invention relates to a low-pressure casting device and a low-pressure casting method, and more specifically, to a low-pressure casting device and a low-pressure casting method that are capable of reducing the amount of oxides generated on a molten-metal surface.

Background Information

A low-pressure casting device generally comprises a dividable casting mold that is placed on the upper part of a holding furnace and a stoke that is linked from the holding furnace to the casting mold, and a molded article is formed by pressurizing the molten metal in the holding furnace to fill the molten metal into the casting mold via the stoke, and solidifying the molten metal in the casting mold. On the other hand, the remaining molten metal in the stoke is returned to the holding furnace due to gravity by stopping and releasing the pressure inside the holding furnace, and the molten-metal surface in the stoke and the molten-metal surface in the holding furnace become the same height.

Japanese Laid-Open Patent Application No. 11-300464 (Patent Document 1) discloses lowering the molten-metal surface in a stoke to the lower end of the stoke by reducing the pressure inside a holding furnace by suctioning, and joining the molten metal in the stoke with the molten metal in the holding furnace, to thereby rapidly increase the temperature of the molten metal in the stoke to a temperature that is required for pouring in order to reduce the cycle time.

In addition, the cleanliness of the molten metal decreases over time, due to generation of oxides and intermetallic compounds. Then, the oxides float in the vicinity of the molten-metal surface to cover the molten-metal surface, and the intermetallic compounds are deposited on the bottom of the holding furnace. However, if a turbulent flow occurs in the molten metal accompanying pouring, etc., the molten-metal surface is ruffled, the oxide film on the molten-metal surface breaks, and new molten metal without an oxide film is exposed to generate more oxides; additionally, the intermetallic compounds at the bottom of the holding furnace are churned up to enter the stoke, which mix in with the molded article and reduce the quality.

Japanese Laid-Open Patent Application No. 11-138250 (Patent Document 2) discloses a molten metal holding furnace configured by two chambers, a molten metal holding chamber and a pressurizing chamber, and cutting off the pressurizing chamber for pressurizing molten metal from the molten metal holding chamber with a cutoff valve, to thereby prevent the molten metal in the molten metal holding furnace coming into contact with air to prevent oxidation of the molten metal.

SUMMARY

However, since the low-pressure casting device disclosed in Patent Document 1 returns all of the molten metal in the stoke to the holding furnace, the distance that the molten metal moves inside the stoke is long, and turbulent flow accompanying the movement of the molten metal is generated to ruffle the molten metal; therefore, new molten-metal surfaces without an oxide film are exposed and a large amount of oxide film is generated, while sediment in the holding furnace is churned up.

In addition, in a low-pressure casting device having a two-chamber type molten metal holding furnace disclosed in Patent Document 2, molten metal flows backward from the sprue toward the pressurizing chamber, accompanying the release of pressure by stopping the pressurization of the pressurizing chamber. Then, by releasing the cutoff valve, the molten metal flows from the molten metal holding chamber into the pressurizing chamber, agitating the molten metal inside the pressurizing chamber. Therefore, it is not possible to prevent oxidation of molten metal that occurs due to churning of sediment, such as intermetallic compounds, and to the ruffling of the molten-metal surface.

The present invention was made in view of such problems of the prior art, and an object thereof is to provide a low-pressure casting device and a low-pressure casting method that are capable of minimizing the oxidation of molten metal, preventing mixture of impurities into the molded article, and reducing the cycle time.

As a result of extensive studies to achieve the object described above, the present inventor has found that by providing a molten-metal level sensor in a stoke and maintaining the molten-metal surface in the stoke at a position higher than the molten-metal surface in a holding furnace, the amount of movement of the molten metal can be minimized to achieve the above-described object, and completed the present invention.

That is, the low-pressure casting device of the present invention comprises a molten-metal level sensor in a stoke, wherein, after supplying the molten metal in the holding furnace to a casting mold via the stoke, the solidified molded article is taken out while maintaining the molten-metal surface in the stoke at a position higher than the molten-metal surface in the holding furnace, and the process transitions to the next casting step.

In addition, the low-pressure casting method of the present invention is characterized by maintaining the molten-metal surface in a stoke at a position higher than the molten-metal surface in the holding furnace, based on the molten-metal surface detected by a molten-metal level sensor provided in the stoke.

According to the present invention, since the molten-metal surface in the stoke is maintained at a position higher than the molten-metal surface in the holding furnace, the moving distance of the molten metal between the preceding casting step and the next casting step is short and the occurrence of turbulent flow in the molten metal is prevented. Therefore, the molten-metal surface is prevented from being ruffled and new molten metal without an oxide film is prevented from being exposed to oxidate the molten metal; at the same time, deposits at the bottom of the holding furnace are not churned up. Furthermore, since the moving distance of the molten metal moving inside the stoke is short, a low-pressure casting device and a low-pressure casting method with a shortened cycle time are provided.

DETAILED DESCRIPTION OF THE EMBODIMENTS

Figure 1:
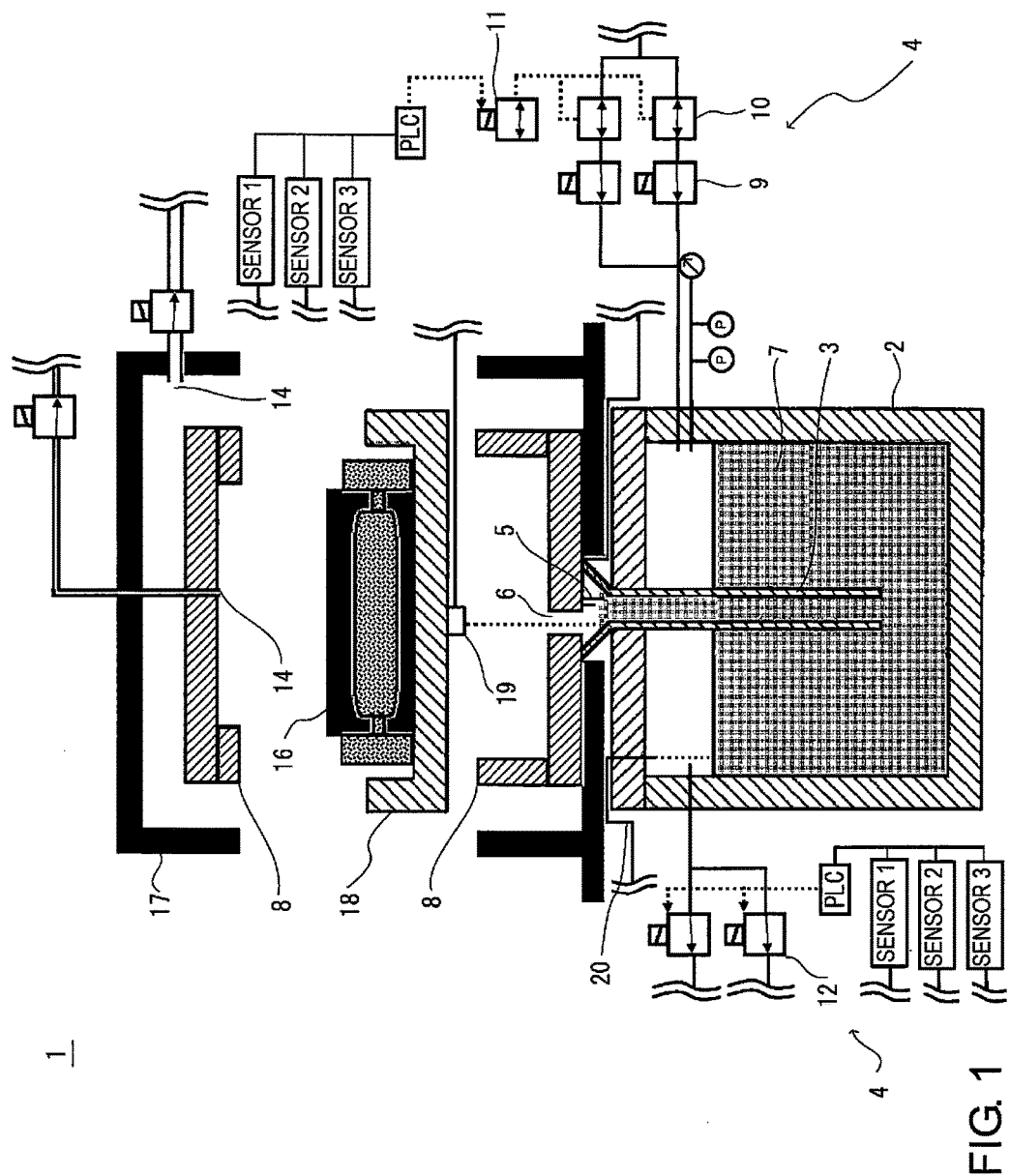
FIG. 1 is a cross-sectional view illustrating one example of the low-pressure casting device of the present invention.

A low-pressure casting device of the present invention, and a low-pressure casting method that uses the low-pressure casting device, will be described in detail. FIG. 1 is a cross-sectional view illustrating one example of the low-pressure casting device of the present invention. The low-pressure casting device 1 of the present invention comprises at least a sealed holding furnace 2, a stoke 3, a pressure control device 4 and an in-stoke molten-metal level sensor 5, and the in-stoke molten-metal level sensor 5 is provided on the upper portion inside the stoke 3, immediately under the sprue 6.

The lower end of the stoke 3 is immersed in the molten metal 7 in the holding furnace 2. When inert gas, such as carbon dioxide, is pressure-fed into the holding furnace 2 by the pressure control device 4, the molten metal 7 rises in the stoke 3 and is supplied/filled into a dividable casting mold 8 via the sprue 6.

The pressure control device 4 comprises a pressure sensor P that detects the pressure inside the holding furnace, an air supply valve 9, a volume booster 10, an electro-pneumatic proportional valve 11, a pressurizing pump, which is not shown, an exhaust valve 12 that discharges the gas inside the holding furnace 2, and a programmable controller (hereinafter can be referred to as PLC) for controlling the above.

A contact-type sensor can be used as the above-described in-stoke molten-metal-level sensor 5, which is capable of detecting the approximate molten metal surface by two hanging sensors with different lengths, or by providing two sensors at different heights.

A suction port 14 can be provided to the casting mold 8 for suctioning a cavity 13 that is formed in the casting mold 8, and a core 15 can be placed inside of the casting mold 8 to cast by a hollow molded article 16.

Figure 2:
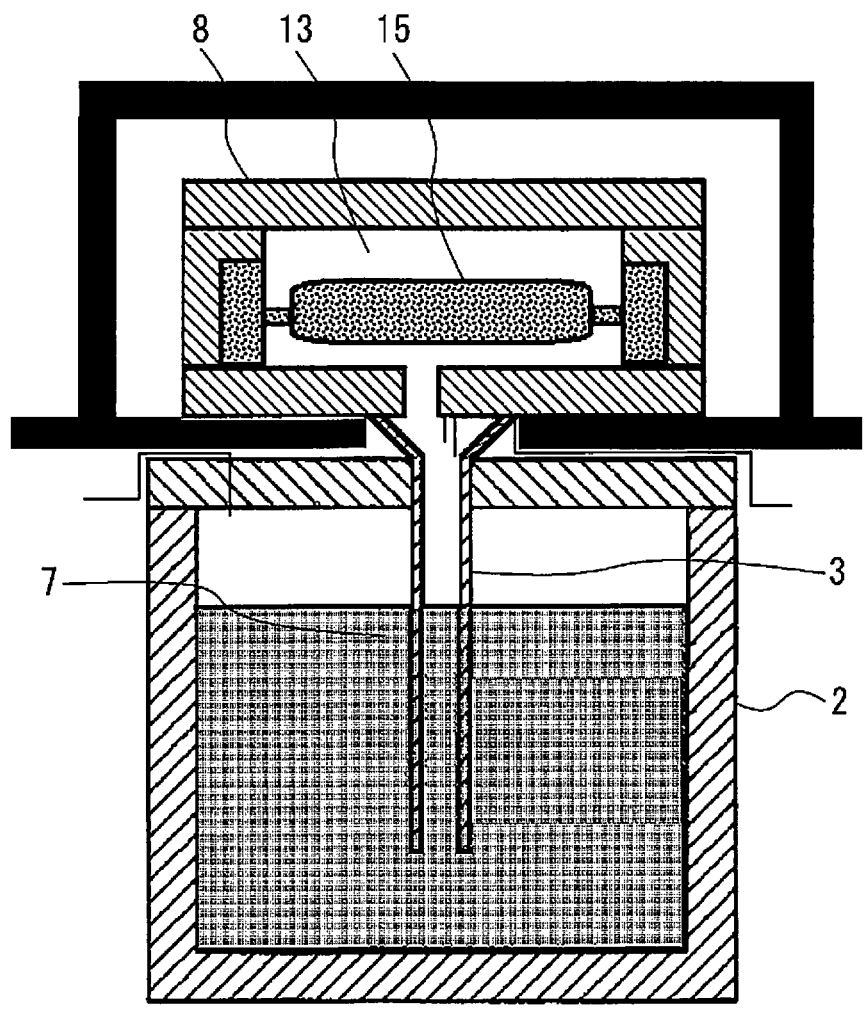
FIG. 2 is a cross-sectional view illustrating one example of a state in which the casting mold of the first shot is closed.

Next, the operation of the low-pressure casting device of the present invention will be described. The casting mold 8 is closed, after placing a core 15 in the casting mold 8 if necessary. In the case of the first shot, the height of the molten metal 7 surface in the stoke 3 is the same as the height of the molten metal 7 surface in the holding furnace 2, as illustrated in FIG. 2.

Figure 3:
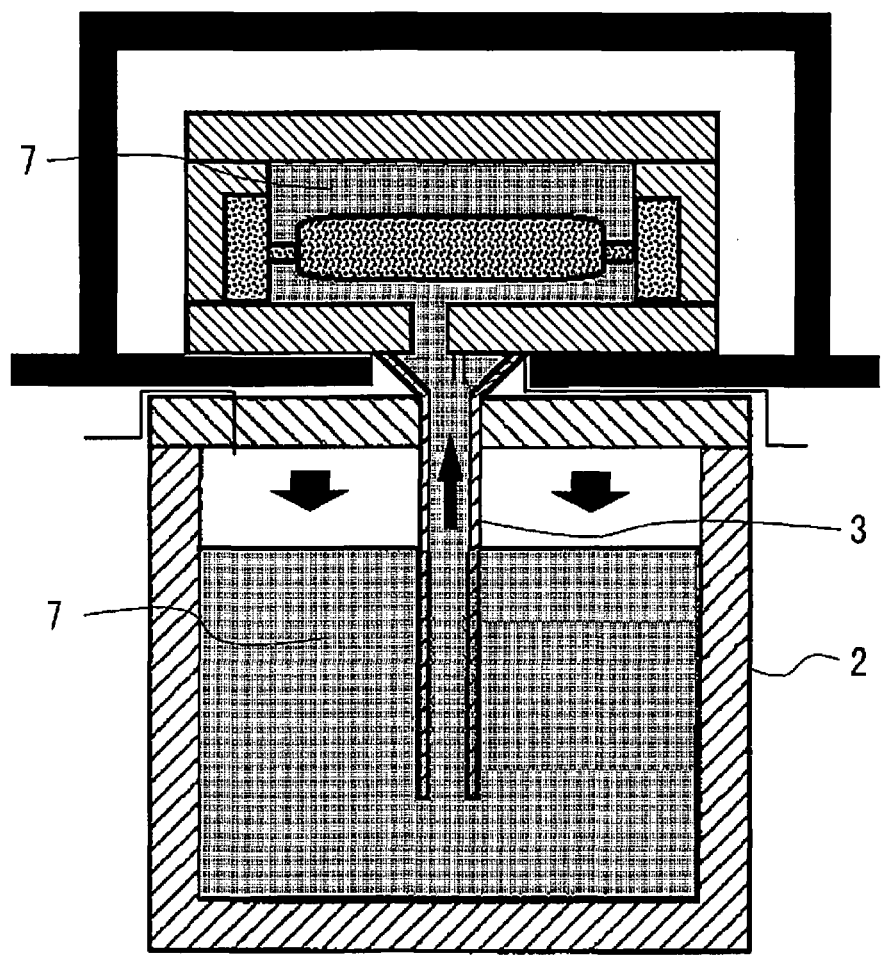
FIG. 3 is a cross-sectional view illustrating one example of a state in which molten metal is filled in a cavity.

The pressure control device 4 pressurizes the inside of the holding furnace 2 by pressure feeding inert gas to push down the molten metal surface in the holding furnace and raise the molten metal 7 in the stoke 3, thereby filling the molten metal 7 in the cavity, as illustrated by the arrows in FIG. 3.

Figure 4:
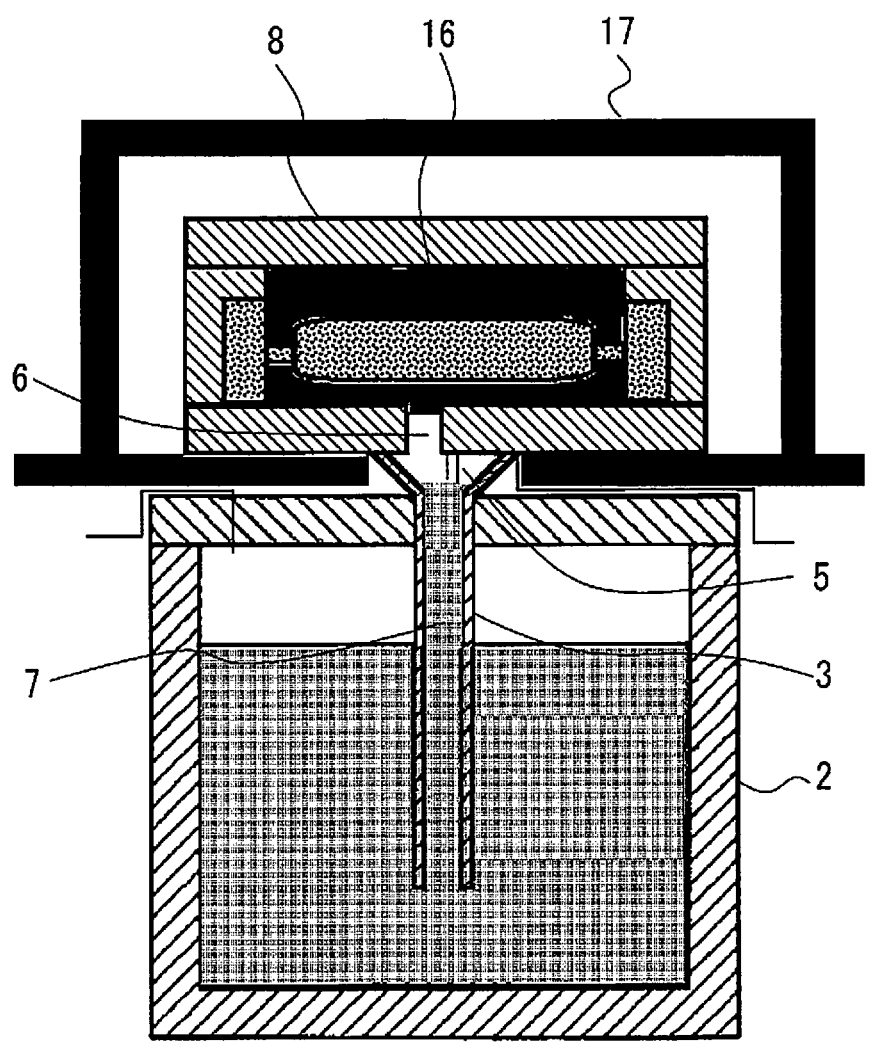
FIG. 4 is a cross-sectional view illustrating one example of a state in which the molten metal of the cavity has been solidified.

After the molten metal 7 filled in the cavity is solidified and the molded article 16 is formed, the pressure control device 4 opens the exhaust valve 12 slightly, and gradually reduces the pressure inside the holding furnace 2 to lower the molten-metal surface below the sprue 6. When the in-stoke molten-metal level sensor 5 detects that the molten-metal surface in the stoke has fallen below the sprue 6, the pressure control device 4 closes the exhaust valve 12 and maintains the pressure inside the holding furnace such that the molten-metal surface in the stoke 3 is maintained at a position higher than the molten-metal surface in the holding furnace 2, as illustrated in FIG. 4.

By maintaining the molten-metal surface in the stoke 3 at a position higher than immediately below the sprue, the distance that the molten metal moves inside the stoke 3 becomes short, so that disturbance of the molten-metal surface is prevented. Furthermore, impurities, such as intermetallic compounds and solidified particles that have been deposited at the bottom of the holding furnace 2 will not be churned up, preventing the impurities from being filled in the casting mold 8. Additionally, since only a portion of the inert gas that is pressurizing the inside of the holding furnace 2 is discharged and the pressure inside the holding furnace is maintained, the amount of inert gas to be pressure-fed in the next step is reduced, and the amount of moisture that enters into the holding furnace 2 accompanying the pressure feeding of inert gas is reduced. Therefore, declines in the quality and the material properties of the molded article due to hydrogen, etc., derived from the moisture are prevented.

The above-described stoke 3 preferably comprises a heater. Since the present invention carries out the transition from the previous casting step, in which molten metal is supplied to a casting mold and the solidified molded article is taken out, to the next casting step while maintaining the molten-metal surface in the stoke at a position higher than the molten-metal surface in the holding furnace, the molten metal in the stoke is easily cooled. By heating the molten metal in the stoke, it is possible to prevent the temperature of the molten metal from decreasing, and to prevent a misrun in the next step.

In addition, when filling the cavity 13 with the molten metal 7, it is preferable to apply suction to the cavity 13 before the molten metal 7 flows into the cavity 13, or at the same time as when the molten metal 7 flows into the cavity 13. By suctioning the cavity 13 from the suction port 14 of the casting mold 8 before the molten metal 7 flows into the cavity 13, gas that is generated by the core 15, etc., being heated by the heat of the molten metal 7 is promptly discharged, preventing the entrainment of air bubbles. Additionally, the flow of the molten metal becomes smooth, the behavior of the running molten metal is stabilized, reducing variation, and improving uniformity among the molded articles. In addition, by suctioning the chamber 17 that covers the entire casting mold 8, it is possible to prevent gas from entering the cavity from gaps in the casting mold 8, accompanying the suction from the suction port 14.

Regarding the molded article 16 in the casting mold 8, the molded article 16 is taken out by opening the dividable casting mold 8, as illustrated in FIG. 1. It is preferable to detect the molten metal surface in the stoke with a non-contact type molten-metal level sensor 19 via the sprue 6 during this mold opening step. It is possible to obtain uniform molded articles by feeding back the molten-metal surface detected by a non-contact type of molten-metal level sensor 19 to the pressure control device, and carrying out a correction of at least one of a molten-metal surface height and a filling control of the molten metal in the next casting step.

The correction of the molten-metal surface height is for adjusting the pressure inside the holding furnace 2 in order to correct the molten metal surface to the predetermined position, based on the accurate molten metal surface in the stoke detected by the non-contact type molten-metal-level sensor 19. In addition, the correction of the filling control is for correcting the pressurization pattern in the next casting step from the relationship between the pressure in the holding furnace 2 and the molten metal surface in the stoke 3, etc., in order to keep the behavior of the running molten metal constant.

In this low-pressure casting method, the molten-metal surface is pushed down by pressure feeding gas into, and pressurizing, the holding furnace, which raises the molten metal in the stoke to fill the cavity with the molten metal. The gas that is used for the pressurization has greater expansion/contraction than solids or liquids, and the volume thereof is easily changed; therefore, it is difficult to control the molten metal surface with high precision, and even if the molten metal surface is detected by a contact-type in-stoke molten-metal level sensor provided in the stoke, an error of several centimeters would occur. Additionally, when the molten metal is used and the molten metal in the holding furnace is reduced, the molten-metal surface in the holding furnace 2 is lowered and the distance to the sprue will change from shot to shot; therefore, it is difficult to accurately sense the molten-metal surface in the stoke from the pressure inside the holding furnace.

If the distance from the molten-metal surface in the stoke to the sprue is not accurate, there will be a mismatch between the timing for switching from the pressurization of the first stage to the pressurization of the second stage, and the timing at which the molten metal flows into the cavity, and it becomes difficult to make the behavior of the running molten metal between shots uniform. In particular, in a thin-walled molded article, the molten metal flows while being solidified; therefore, if the behavior of the running molten metal fluctuates, the quality of the molded articles, as well as the uniformity among the molded articles, deteriorates.

The non-contact type of molten-metal level sensor 19 detects the accurate molten metal surface in the stoke and provides feedback to the pressure control device. The PLC of the pressure control device controls the electro-pneumatic proportional valve based on the accurate molten metal surface and corrects the height of the molten metal surface to the predetermined position. Therefore, the position of the molten metal surface in the stoke is maintained at the same height for every shot. Then, by correcting the pressurization pattern from the relationship between the corrected molten-metal surface height and the pressure in the holding furnace, even if the amount of molten metal in the holding furnace, that is, the relationship between the pressure in the holding furnace and the height of the molten-metal surface in the stoke, is changed, the behavior of the running molten metal for each shot is made uniform, and uniform and high quality molded articles can be formed.

Additionally, it is preferable to provide an in-furnace molten-metal level sensor 20 for detecting the molten-metal surface in the holding furnace 2. By correcting together with the amount of molten metal in the holding furnace 2, it is possible to make the behavior of the running molten metal even more uniform. Since the pressure control device 4 of the present invention comprises an electro-pneumatic proportional valve, which is capable of carrying out stepless control, and a volume booster, and the volume booster controls the output pressure based on air signals from the electro-pneumatic proportional valve, it is possible to carry out molten metal surface correction and filling control with high precision.

An optical sensor using laser light, etc., may be used as the sensor for the non-contact type molten-metal-level sensor 19 described above. Since a non-contact type of sensor can make measurements in a short period of time and from a location away from the molten metal, it is possible to prevent the sensor from being exposed to a harsh environment of high temperature and much dust, etc., for a long period of time; therefore, high-precision measurement is possible for a long period of time.

The non-contact type molten-metal level sensor 19 is preferably provided on an extraction device for taking out products, such as the base 18, as illustrated in FIG. 1. By providing on an extraction device, it is possible to measure the molten metal surface in parallel with the extraction step, without providing an additional molten metal surface measuring step, and it becomes possible to promptly transition to the next step.

Figure 5:
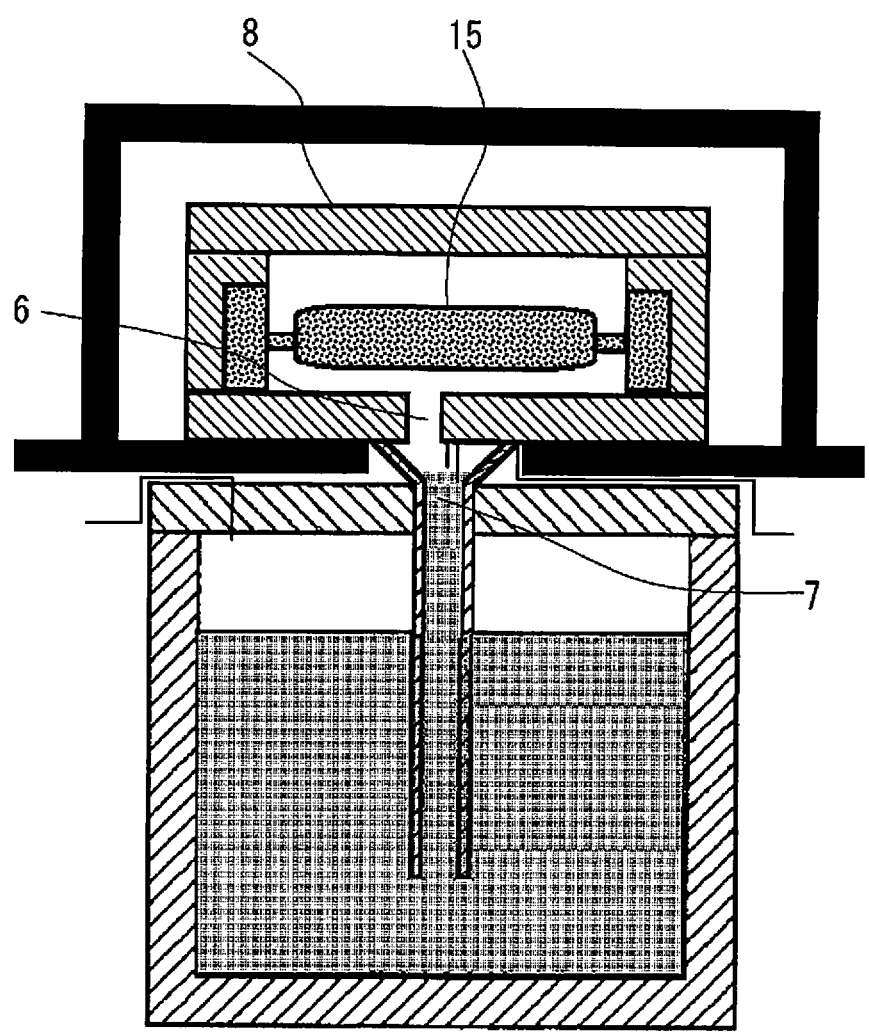
FIG. 5 is a cross-sectional view illustrating one example of a state after taking out a molded article and before starting the next shot.

Then, when the extraction of the molded article 16 and the previous casting step is completed, the casting mold 8 is closed, placing the core 15 in the casting mold 8 if necessary, and the process proceeds to the next casting step, as illustrated in FIG. 5. At this time, since the molten-metal surface of the molten metal 7 is immediately below the sprue 6, and the movement distance of the molten metal 7 is short, exposure of clean molten-metal surfaces without an oxide film is reduced, and the amount of generated oxides is reduced.

Figure 6:
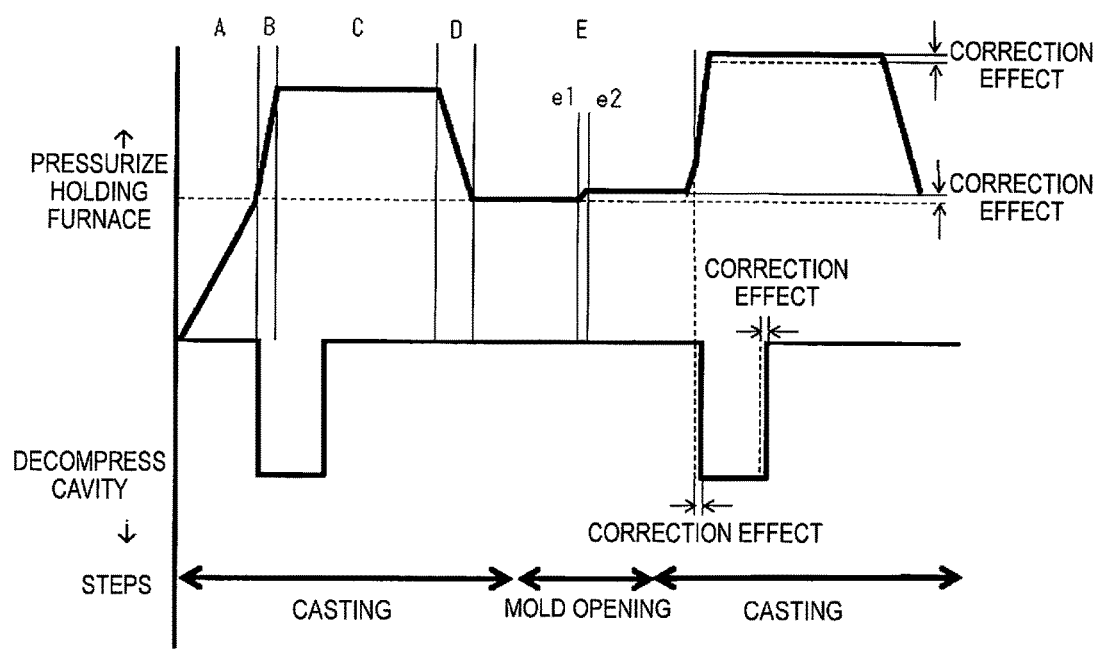
FIG. 6 is a graph illustrating one example of the relationship between the pressurization of the holding furnace and the decompression inside the casting mold.

Here, the timings of the pressurization of the holding furnace and the decompression in the casting mold are described using FIG. 6. In FIG. 6, the molten metal rises in the stoke 3 in A, due to the pressurization of the first stage in the holding furnace 2. When the molten metal 7 reaches the sprue 6, the suctioning of the cavity 13 is started at the same time as switching to the pressurization of the second stage, when the filling speed is controlled in B. When the cavity 13 is filled by the molten metal 7, the pressurization of the holding furnace 2 is stopped, as illustrated by C, and pressure is maintained until the molten metal 7 is solidified. On the other hand, the suctioning of the cavity is continued for some time, even after the cavity is filled with the molten metal 7. By continuing the suction, preceding molten metal that includes impurities exits from the suction port 14, thereby improving the quality of the molded article.

When the molten metal filled in the cavity is solidified, the pressure of the holding furnace 2 is gradually lowered, as illustrated at D, and the molten-metal surface is lowered to a predetermined position below the sprue. Then, the pressure in the holding furnace 2 is maintained, and the casting mold 8 is opened in a state in which the molten-metal surface in the stoke 3 is maintained at a position higher than the molten-metal surface in the holding furnace 2, to take out the molded article 16.

In the step of taking out the molded article in E, the molten metal surface in the stoke 3 is detected by the non-contact type molten-metal level sensor 19 in e1, and the height of the molten metal surface is corrected in e2. By the molten-metal surface being corrected to a constant height, the timing at which the molten metal 7 reaches the sprue 6 and it is switched to the pressurization of the second stage, the speed at which the molten metal 7 is filled in the cavity and the timing at which the pressurization of the holding furnace 2 is stopped, will not vary in the filling step of the next casting step. Therefore, it is possible to run the molten metal with the desired behavior, and to form a high-quality molded article.

In the foregoing, a case in which the filling control of the molten metal is carried out by pressurizing the inside of the holding furnace 2 with the pressure control device 4 was described; however, the filling control of the molten metal may be carried out by an electromagnetic pump.

The invention claimed is:

1. A low-pressure casting device comprising:
    a holding furnace for holding molten metal;
    a stoke having a lower end immersed in the molten metal in the holding furnace for supplying molten metal into a casting mold via a sprue,
    a pressure control device configured to move the molten metal in the stoke and fill the casting mold with the molten metal, the pressure control device including a controller programmed to control the pressure control device during a casting cycle in which molten metal is supplied to the casting mold and a solidified article is taken out of the casting mold;
    an extraction device configured to take out the molded article;
    a molten-metal level sensor configured to detect a height of a molten metal surface of the molten metal in the stoke, the molten-metal level sensor being provided on the extraction device, and
    the controller being programmed to correct a filling of the casting mold with the molten metal in a subsequent casting cycle based on the height of the molten metal surface detected by the molten-metal level sensor in a current casting cycle.

2. The low-pressure casting device according to claim 1, wherein
    the controller of the pressure control device is further programmed to maintain the molten-metal surface in the stoke at a position higher than a molten-metal surface in the holding furnace while transitioning from the current casting cycle to the subsequent casting cycle.

3. The low-pressure casting device according to claim 1, wherein
    the casting mold comprises a suction port to suction an inside of the casting mold before molten metal flows into the casting mold.

4. The low-pressure casting device according to claim 1, wherein
    the controller executes a pressurization pattern to fill the casting mold with the molten metal, and the controller corrects the filling of the casting mold in the subsequent casting cycle by correcting the pressurization pattern.

5. The low-pressure casting device according to claim 4, wherein
    the pressure control device further includes a pressure sensor that detects a pressure inside the holding furnace and a valve arranged to regulate a supply of air to the holding furnace,
    the controller executes the pressurization pattern by controlling the valve.

6. The low-pressure casting device according to claim 1, wherein
    the molten-metal level sensor is a non-contact type molten-metal level sensor.

7. A low-pressure casting method comprising:
    filling a casting mold with molten metal in a holding furnace including raising the molten metal in a stoke having a lower end immersed in the molten metal in the holding furnace for supplying the molten metal into a casting mold via a sprue;
    stopping the filling of the casting mold and lowering the molten metal in the stoke; and
    opening the casting mold and taking a molded article out of the casting mold using an extraction device configured to take out the molded article,
    detecting a height of a molten metal surface of the molten metal in the stoke using a molten-metal level sensor provided on the extraction device,
    correcting the filling of the casting mold with the molten metal in a subsequent casting based on the detected height of the molten-metal surface.

8. The low-pressure casting method according to claim 7, further comprising
    a suctioning step for suctioning inside the casting mold, wherein the suctioning step starts suctioning inside the casting mold before the molten metal flows into the casting mold.

* * * * *